United States Patent
Li

(10) Patent No.: US 9,734,872 B2
(45) Date of Patent: Aug. 15, 2017

(54) METHOD AND ELECTRONIC APPARATUS FOR GENERATING TIME-LAPSE VIDEO AND RECORDING MEDIUM USING THE METHOD

(71) Applicant: HTC Corporation, Taoyuan (TW)

(72) Inventor: Kuan-Wei Li, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/001,115

(22) Filed: Jan. 19, 2016

(65) Prior Publication Data
US 2017/0206935 A1    Jul. 20, 2017

(51) Int. Cl.
| | |
|---|---|
| H04N 9/80 | (2006.01) |
| G11B 27/00 | (2006.01) |
| H04N 5/93 | (2006.01) |
| G11B 27/36 | (2006.01) |
| H04N 5/232 | (2006.01) |
| H04N 5/262 | (2006.01) |
| H04N 5/77 | (2006.01) |
| G11B 27/031 | (2006.01) |
| H04N 5/228 | (2006.01) |
| H04N 5/225 | (2006.01) |

(52) U.S. Cl.
CPC ............ *G11B 27/36* (2013.01); *G11B 27/031* (2013.01); *H04N 5/23258* (2013.01); *H04N 5/2621* (2013.01); *H04N 5/772* (2013.01)

(58) Field of Classification Search
CPC .......... H04N 5/228; H04N 5/225; H04N 9/94; H04N 9/80; H04N 5/93; G11B 27/00

USPC ...... 348/208.3, 208.2, 207.99; 386/242, 280, 386/278

See application file for complete search history.

(56) References Cited

U.S. PATENT DOCUMENTS

| | | | | |
|---|---|---|---|---|
| 2009/0110372 | A1* | 4/2009 | Morioka | G11B 27/034 386/248 |
| 2015/0220249 | A1* | 8/2015 | Snibbe | G06F 3/0412 715/719 |
| 2016/0351231 | A1* | 12/2016 | Woods | G11B 27/28 |

FOREIGN PATENT DOCUMENTS

TW     201044877     12/2010

OTHER PUBLICATIONS

"Office Action of Taiwan Counterpart Application", issued on Sep. 21, 2016, p. 1-p. 4.

* cited by examiner

*Primary Examiner* — Daquan Zhao
(74) *Attorney, Agent, or Firm* — Jianq Chyun IP Office

(57) ABSTRACT

A method and an electronic apparatus for generating a time-lapse video and a recording medium using the method are provided. In the method, a movement of the electronic apparatus is detected by the at least one motion sensor while a video is recorded by the image capturing device. A detected movement is analyzed to determine a stability of the electronic apparatus for each of a plurality of time intervals during which the video is recorded. At least one clip of the video is converted into a time-lapse video according to a determined stability of the electronic apparatus associated with each of the plurality of the time intervals during which the clip of the video is recorded.

18 Claims, 3 Drawing Sheets

METHOD AND ELECTRONIC APPARATUS FOR GENERATING TIME-LAPSE VIDEO AND RECORDING MEDIUM USING THE METHOD

BACKGROUND

Time-lapse photography is a technique that records image frames with a shutter speed lower than a normal speed. When a time-lapse video is played, time appears to be moving faster and thus lapsing. For example, for a video normally recorded at 30 frames per second, a time-lapse video may be recorded only once per second. As a result, when the time-lapse video is played at a frame rate like 30 frames per second, the time is lapsing 30 times faster and the moving speed of the objects in the video appears to be 30 times faster than a normal speed.

However, it is known that when recording a video, the video quality highly depends on the stability of the camera. If the camera is shaking during video recording, the shaking also appears on the video frames being recorded and blurs may further appear on the video frames. As for a time-lapse video or a hyperlapse video, the influence of shaking is even worse since the video is played many times faster than a normal speed and the shaking appears to be more serious on the fast played video frames.

SUMMARY

To avoid the influence of shaking on the time-lapse video, it is better to convert the video clips recorded under a stable status into the time-lapse clips while keep the video clips recorded under an unstable status in a normal frame rate. Accordingly, the disclosure provides a method and an electronic apparatus for generating a time-lapse video and the recording medium using the method, through which a stability of the electronic apparatus during video recording is determined and used as a reference to convert the recorded video clips into the time-lapse clips, so as to obtain the time-lapse video with better quality.

The disclosure provides a method for generating a time-lapse video, adapted for an electronic apparatus having an image capturing device and at least one motion sensor. In the method, a movement of the electronic apparatus is detected by the at least one motion sensor while a video is recorded by the image capturing device. A detected movement is analyzed to determine a stability of the electronic apparatus for each of a plurality of time intervals during which the video is recorded. At least one clip of the video is converted into a time-lapse video according to a determined stability of the electronic apparatus associated with each of the plurality of the time intervals during which the clip of the video is recorded.

In an example of the present disclosure, in the step of analyzing the detected movement to determine the stability of the electronic apparatus for each of the plurality of time intervals during which the video is recorded, a shacking level of the electronic apparatus for each of the time intervals is computed according to the detected movement and compared with a shaking threshold. The stability of the electronic apparatus is determined as unstable for the time interval if a computed shacking level of the time interval is higher than the shaking threshold.

In an example of the present disclosure, in the step of converting the at least one clip of the video into the time-lapse video according to the determined stability of the electronic apparatus associated with each of the plurality of the time intervals during which the clip of the video is recorded, the clip of the video is converted into the time-lapse video if the stability of the electronic apparatus of the electronic apparatus associated with each of the plurality of the time interval is determined as stable during which the clip of the video is recorded.

In an example of the present disclosure, a shutter speed of the clip of the video is kept in an original frame rate if the stability of the electronic apparatus associated with one of the plurality of the time intervals is determined as unstable during which the clip of the video is recorded.

In an example of the present disclosure, the clip of the video is removed from the video if the stability of the electronic apparatus associated with one of the plurality of the time intervals is determined as unstable during which the clip of the video is recorded.

In an example of the present disclosure, in the step of analyzing the detected movement to determine the stability of the electronic apparatus for each of the plurality of time intervals during which the video is recorded, a moving speed or an angular speed of the electronic apparatus for each of the time intervals is computed according to the detected movement and compared with a speed threshold. The stability of the electronic apparatus is determined as unstable for the time interval if the computed moving speed or the angular speed for the time interval is higher than the speed threshold.

In an example of the present disclosure, in the step of converting the at least one clip of the video into the time-lapse video according to the determined stability for the time interval during which the clip of the video is recorded, the clip of the video is converted into the time-lapse video if the stability of the electronic apparatus associated with one of the plurality of the time intervals is determined as stable during which the clip of the video is recorded.

In an example of the present disclosure, the method further comprises keeping a shutter speed of the clip of the video in an original frame rate if the stability of the electronic apparatus associated with the time interval is determined as unstable during which the clip of the video is recorded.

In an example of the present disclosure, the method further comprises removing the clip of the video from the video if the stability of the electronic apparatus associated with the time interval is determined as unstable during which the clip of the video is recorded.

In an example of the present disclosure, in the step of converting the at least one clip of the video into the time-lapse video according to the determined stability of the electronic apparatus associated with each of the plurality of time intervals during which the clip of the video is recorded, a frame rate to be applied to the clip of the video is further determined according to a level of the determined stability of the electronic apparatus associated with each of the plurality of time intervals during which the clip of the video is recorded, and the at least one clip of the video is converted into the time-lapse video according to a determined frame rate.

The disclosure provides an electronic apparatus for generating a time-lapse video, which includes an image capturing device, at least one motion sensor, a storage device, and a processor. The image capturing device is configured to record a video. The motion sensor is configured to detect a movement of the electronic apparatus. The storage device is configured to record the video and a plurality of modules. The processor is coupled to the image capturing device, the at least one motion sensor and the storage device and configured to access and execute the modules recorded in the storage device. The modules include a movement detecting module, an analyzing module, and a converting module. The movement detecting module is configured to detect the movement of the electronic apparatus by using the at least one motion sensor while the image capturing device records the video. The analyzing module is configured to analyze a detected movement to determine a stability of the electronic apparatus for each of a plurality of time intervals during which the video is recorded. The converting module is configured to convert at least one clip of the video into a time-lapse video according to the determined stability of the electronic apparatus associated with each of the plurality of the time intervals during which the clip of the video is recorded.

In an example of the present disclosure, the analyzing module comprises computing a shacking level of the electronic apparatus for each of the time intervals according to the detected movement, comparing a computed shacking level with a shaking threshold, and determining the stability of the electronic apparatus is unstable for the time interval if a computed shacking level for the time interval is higher than the shaking threshold.

In an example of the present disclosure, the converting module comprises converting the clip of the video into the time-lapse video if the analyzing module determines the stability of the electronic apparatus associated with one of the plurality of the time intervals is stable during which the clip of the video is recorded.

In an example of the present disclosure, the converting module further keeps a shutter speed of the clip of the video in an original frame rate or removes the clip of the video from the video if the analyzing module determines the stability of the electronic apparatus associated with one of the plurality of the time intervals is unstable during which the clip of the video is recorded.

In an example of the present disclosure, the analyzing module comprises computing a moving speed or an angular speed of the electronic apparatus for each of the time intervals according to the detected movement and comparing the moving speed or the angular speed with a speed threshold, and determining the stability of the electronic apparatus associated with one of the plurality of the time intervals is unstable if the computed moving speed or the angular speed for the time interval is higher than the speed threshold.

In an example of the present disclosure, the converting module comprises converting the clip of the video into the time-lapse video if the analyzing module determines the stability of the electronic apparatus associated with one of the plurality of the time intervals is stable during which the clip of the video is recorded.

In an example of the present disclosure, the converting module comprises keeping a shutter speed of the clip of the video in an original frame rate or removing the clip of the video from the video if the analyzing module determines the stability of the electronic apparatus associated with one of the plurality of the time intervals is unstable during which the clip of the video is recorded.

In an example of the present disclosure, the converting module further determines a frame rate to be applied to the clip of the video according to a level of the determined stability of the electronic apparatus associated with each of the plurality of time intervals during which the clip of the video is recorded, and converting the at least one clip of the video into the time-lapse video according to a determined frame rate.

In an example of the present disclosure, the at least one sensor comprises one or a combination of a G-sensor, a gyro sensor, a digital compass, or a GPS.

The disclosure provides an non-transitory computer readable medium for recording a computer program to be loaded by an electronic apparatus to execute steps of: detecting a movement of the electronic apparatus by using at least one motion sensor while recording a video by using an image capturing device; analyzing a detected movement to determine a stability of the electronic apparatus for each of a plurality of time intervals during which the video is recorded; and converting at least one clip of the video into a time-lapse video according to a determined stability of the electronic apparatus associated with each of the plurality of the time intervals during which the clip of the video is recorded.

Based on the above, in the method and the electronic apparatus for generating a time-lapse video and the recording medium using the method provided by the present disclosure, the stability of the electronic apparatus is determined while recording a video and used to decide which part of the video is suitable to be converted into a time-lapse video. Accordingly, a time-lapse video with better quality is generated.

In order to make the aforementioned and other features and advantages of the invention more comprehensible, several examples accompanied with figures are described in detail below.

BRIEF DESCRIPTION OF THE DRAWINGS

The accompanying drawings are included to provide a further understanding of the invention, and are incorporated in and constitute a part of this specification. The drawings illustrate examples of the invention and, together with the description, serve to explain the principles of the invention.

DESCRIPTION OF EXAMPLES

In the present disclosure, when generating a time-lapse video or a hyperlapse video, factors such as shaking level, moving speed, or angular speed that may reflect the stability of the electronic apparatus are determined according to data detected by motions sensors disposed on the electronic apparatus. The determined stability is used as a reference to decide how to convert the clips in the recorded video into time-lapse clips, such that a time-lapse video containing well converted time-lapse clips is obtained.

Figure 1:
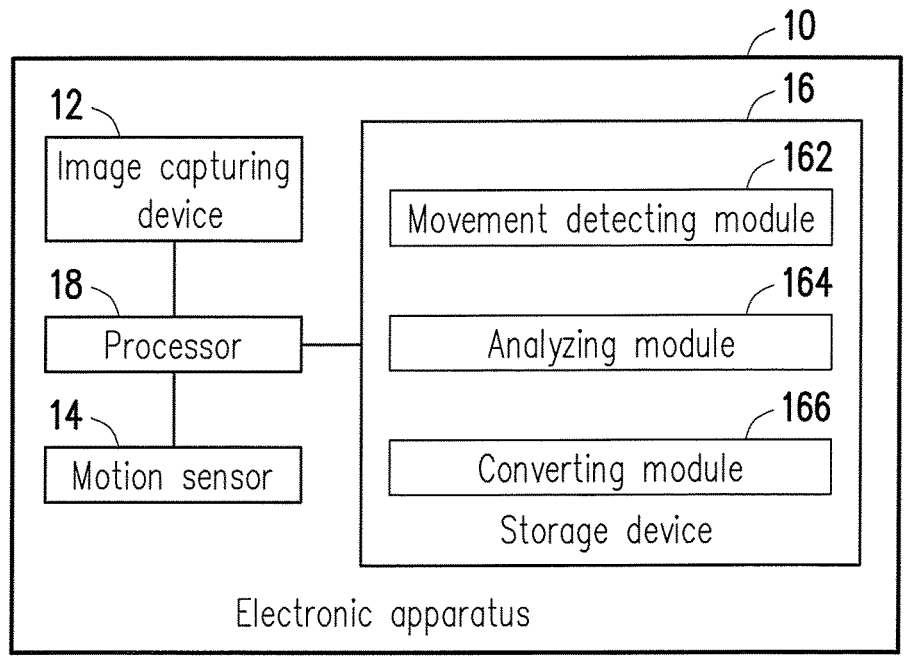
FIG. 1 is a block diagram of an electronic apparatus for generating a time-lapse video according to an example of the disclosure.

FIG. 1 is a block diagram of an electronic apparatus for generating a time-lapse video according to an example of the disclosure. With reference to FIG. 1, in the present example, the electronic apparatus 10 is, for example, a digital camera, a digital camcorder, a smartphone, a PDA, a tablet PC, a laptop, a smart glass, a smart watch or any other stationary or portable apparatus having an image capturing function. The electronic apparatus 10 includes an image capturing device 12, at least one motion sensor 14, a storage device 16 and a processor 18, and functions thereof are respectively described below.

The image capturing device 12 is, for example, a camera or a camcorder and may include an optical fixed-focus lens or an optical zoom lens, and an image sensing element such as a charge coupled device (CCD) or a complementary metal-oxide semiconductor (CMOS), but the disclosure is not limited thereto.

The at least one motion sensor 14 is, for example, a gravity sensor (G sensor), a gyro sensor, a digital compass, a global positioning system (GPS) sensor, or a combination of the above sensors capable of detecting acceleration, an inclination angle, a rotation angle or a facing direction of the electronic apparatus 10, and/or any other sensor which can alone or in combination detect the posture or the motion of the electronic apparatus 10, but the disclosure is not limited thereto. In the following, one motion sensor 14 is described as an example for illustrating the method for generating the time-lapse video, but in other examples, multiple motion sensors may also be implemented.

The storage device 16 is, for example, any type of fixed or movable random access memory (RAM), a read-only memory (ROM), a flash memory or a similar element or a combination of aforesaid elements. In the present example, the storage device 16 is configured to record the video captured by the image capturing device 12, and further record a movement detecting module 162, an analyzing module 164, and a converting module 166. The aforesaid modules are, for example, programs stored in the storage device 16 which may be loaded into the processor 18 of the electronic apparatus 10, such that the processor 18 may execute a time-lapse video generating function.

The processor 18 may be, for example, a central processing unit (CPU), a programmable general purpose or special purpose microprocessor, a digital signal processor (DSP), a programmable controller, an application specific integrated circuit (ASIC), a programmable logic device (PLD), or any other similar device or a combination thereof. The processor 18 is coupled to the image capturing device 12, the motion sensor 14 and the storage device 16, and is configured to load the programs from the storage device 16 so as to perform the time-lapse video generating method of the disclosure. Examples describing detailed steps of the method will be described below.

Figure 2:
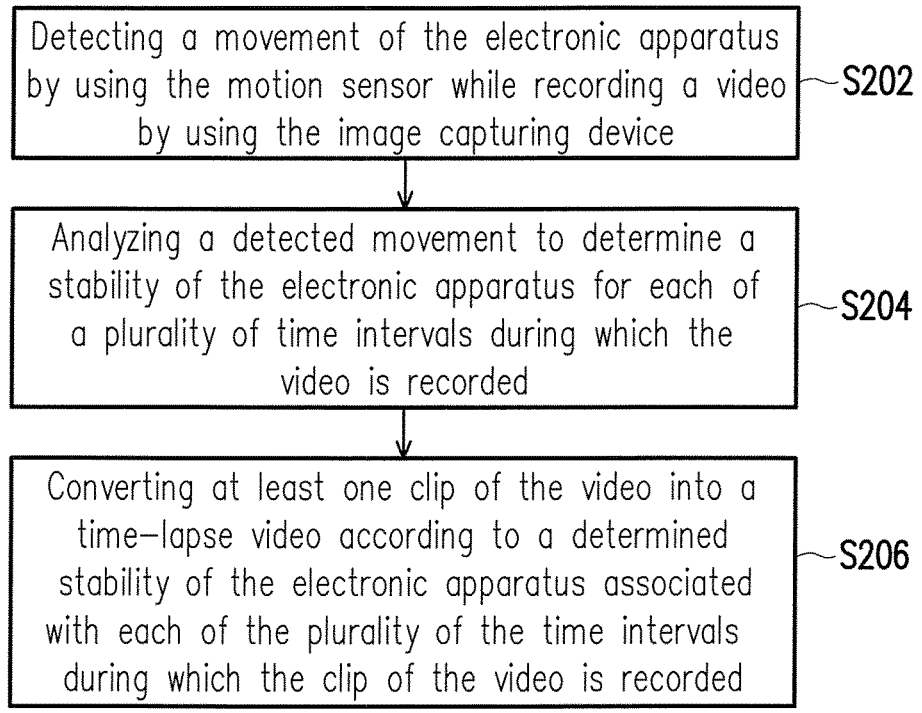
FIG. 2 is a flowchart illustrating a method for generating a time-lapse video according to an example of the disclosure.

FIG. 2 is a flowchart illustrating a method for generating a time-lapse video according to an example of the disclosure. Referring to FIG. 1 and FIG. 2 together, the method of the present example is adapted for the electronic apparatus 10 of FIG. 1. Detailed steps in the method of the present example are described below with reference to each component of the electronic apparatus 10 depicted in FIG. 1.

First, the movement detecting module 162 detects the movement of the electronic apparatus 10 by using the motion sensor 14 while recording a video by using the image capturing device 12 (step S202). In one example, the movement detecting module 162 may detect the movement of the electronic apparatus 10 in three dimensions by using a G-sensor, and the detected movement may include a magnitude and a direction of accelerations in three axes. In another example, the movement detecting module 162 may detect tilting or rotation of the electronic apparatus 10 in three dimensions by using a gyro sensor. In yet another example, the movement detecting module 162 may locate the electronic apparatus 10 by using a GPS sensor and detect a moving distance and a moving direction of the electronic apparatus 10 according to the location change of the electronic apparatus 10.

Then, the analyzing module 164 analyzes the detected movement to determine a stability of the electronic apparatus 10 for each of a plurality of time intervals during which the video is recorded (step S204), and finally the converting module 166 converts at least one clip of the video into a time-lapse video according to the determined stability of the electronic apparatus 10 associated with each of the plurality of the time intervals during which the clip of the video is recorded (step S206).

In detail, the analyzing module 164 may compute a motion parameter (e.g., shaking level, moving speed, or angular speed) according to data of the movement detected by the movement detecting module 162 and compare the same with a previous determined threshold, so as to determine the stability of the electronic apparatus 10. If the computed motion parameter is higher than the threshold, the analyzing module 164 determines the stability of the electronic apparatus is unstable. Otherwise, the analyzing module 164 determines the stability of the electronic apparatus is stable.

In response to the determination of the analyzing module 164, the converting module 166 may convert the clip of the video into the time-lapse video if the analyzing module 164 determines the stability of the electronic apparatus associated with one of the plurality of time intervals is stable during which the clip of the video is recorded. On the contrary, the converting module 166 may keep the clip of the video in an original frame rate or removes the clip of the video from the video if the analyzing module 164 determines the stability of the electronic apparatus 10 associated with one of the plurality of the time intervals is unstable during which the clip of the video is recorded.

It is noted that the analyzing module 164 may compute the stability of the electronic apparatus 10 at different time intervals which may have a fixed time length or various time lengths. In detail, in one example, the analyzing module 164 may constantly compute the stability of the electronic apparatus 10, and group the continuously computed stability having close values to determine the time intervals. However, in another example, the analyzing module 164 may determine the time intervals according to abrupt values of the stability, a content of the video, or other factors, and the disclosure is not limited thereto. For example, an abrupt angular speed change with a constant moving speed may reveal that the electronic apparatus is making a turn such that the time point of the angular speed change can be used to separate the time intervals.

Through aforesaid method, the stability of the electronic apparatus that captures a video is determined and used as a reference to convert the clips of the recorded video into the time-lapse clips. As such, the clips of the video can be appropriately converted, and a time-lapse video containing well converted time-lapse clips is obtained.

It is noted that the aforesaid motion parameters may include a shaking level, a moving speed, or an angular speed, and can be used alone or in combination to determine the stability of the electronic apparatus and further to convert the video clips. Examples are given below for further illustration.

Figure 3:
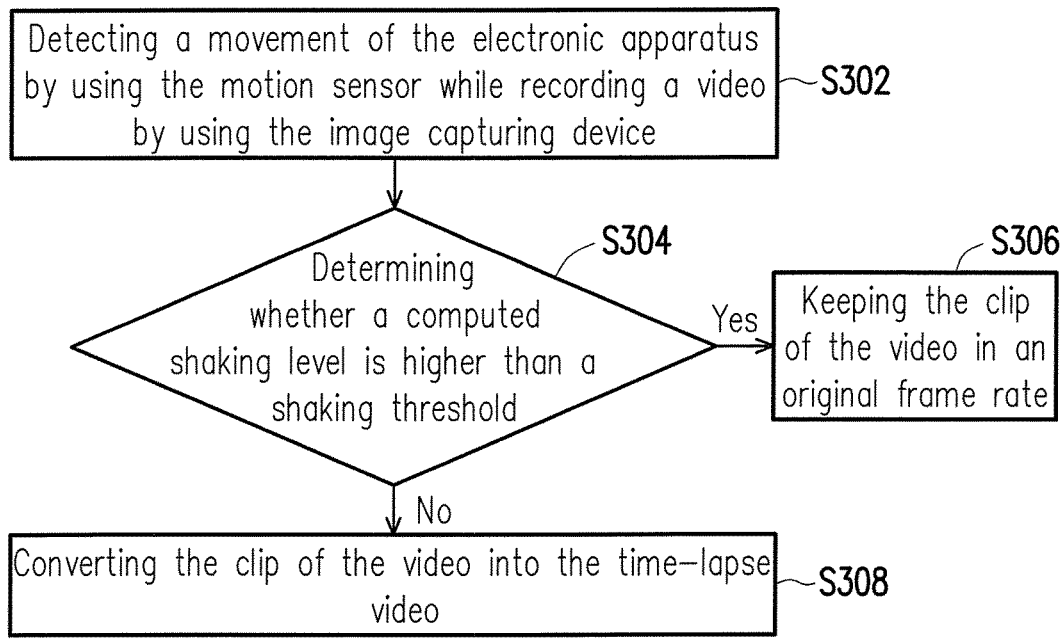
FIG. 3 is a flowchart illustrating a method for generating a time-lapse video according to an example of the disclosure.

As for the shaking level, FIG. 3 is a flowchart illustrating a method for generating a time-lapse video according to an example of the disclosure. Referring to FIG. 1 and FIG. 3 together, the method of the present example is adapted for the electronic apparatus 10 of FIG. 1. Detailed steps in the method of the present example are described below with reference to each component of the electronic apparatus 10 depicted in FIG. 1.

First, the analyzing module 164 computes a shacking level of the electronic apparatus 10 for each of the time intervals according to the detected movement (step S302). The shacking level may be computed according to a change on the accelerations detected in a specific direction or multiple directions for the time interval, which is not limited herein. A high shacking level reflects a worse quality of video frames while a low shacking level reflects a better quality of video frames.

Accordingly, the analyzing module 164 determines whether the computed shaking level is higher than a shaking threshold (step S304). The shaking threshold may be obtained by computing the quality of the video frames recorded under different shaking levels, determining the least quality that is acceptable by a user, and using the corresponding shaking level as the shaking threshold.

If the computed shaking level is determined as higher than the shaking threshold, the analyzing module 164 determines the electronic apparatus 10 is extremely unstable during the time interval and accordingly estimates the clip of the video captured during the time interval is not suitable for being converted into the time-lapse video, and therefore the converting module 166 keeps the clip of the video in an original frame rate (step S306).

On the other hand, if the computed shaking level is determined as not higher than the shaking threshold, the analyzing module 164 determines the electronic apparatus 10 is stable during the time interval and accordingly estimates the clip of the video captured during the time interval is suitable for being converted into the time-lapse video, and therefore the converting module 166 converts the clip of the video into the time-lapse video (step S308). As a result, the clips of the video can be appropriately converted or kept unchanged, and a time-lapse video containing well converted time-lapse clips is obtained.

It is noted that, in another example, the converting module 166 may simply remove the clip of the video from the video if the analyzing module 164 determines the stability of the electronic apparatus 10 is unstable for the time interval during which the clip of the video is recorded, so as to obtain a time-lapse video with better quality.

Figure 4:
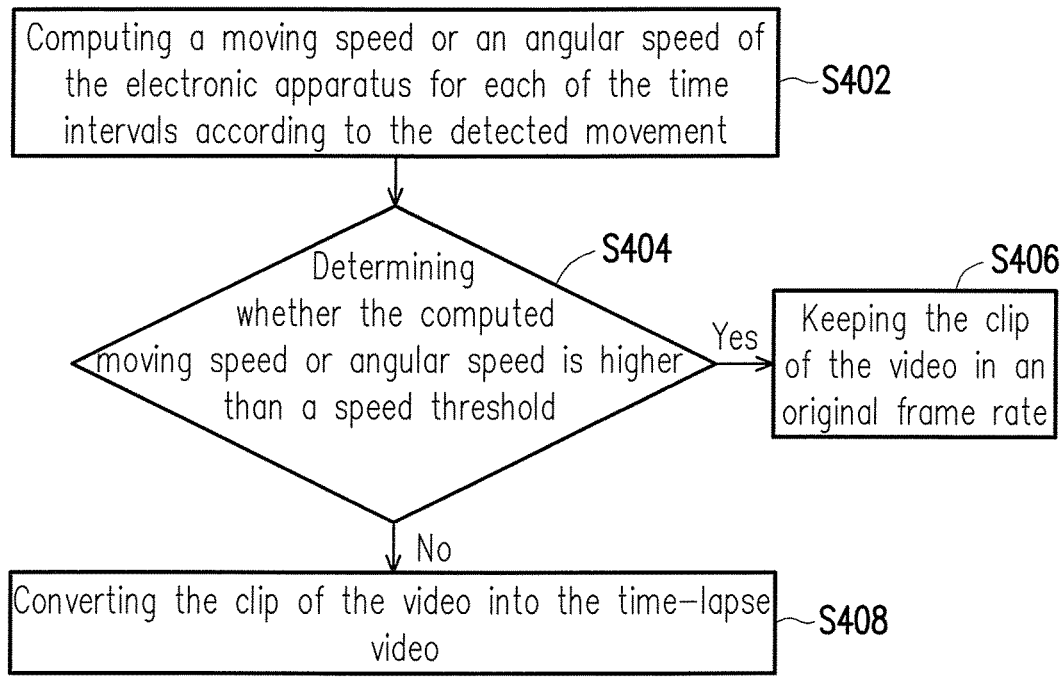
FIG. 4 is a flowchart illustrating a method for generating a time-lapse video according to an example of the disclosure.

As for the moving speed or the angular speed, FIG. 4 is a flowchart illustrating a method for generating a time-lapse video according to an example of the disclosure. Referring to FIG. 1 and FIG. 4 together, the method of the present example is adapted for the electronic apparatus 10 of FIG. 1. Detailed steps in the method of the present example are described below with reference to each component of the electronic apparatus 10 depicted in FIG. 1.

First, the analyzing module 164 computes a moving speed or an angular speed of the electronic apparatus 10 for each of the time intervals according to the detected movement (step S402). The moving speed may be computed according to a moving distance detected by a GPS sensor in a time interval, and the angular speed may be obtained directly from a gyro sensor.

Then, the analyzing module 164 determines whether the computed moving speed or angular speed is higher than a speed threshold (step S404). Similar to the shaking threshold, the speed threshold may be obtained by computing the quality of the video frames recorded under different moving speeds or angular speeds, determining the least quality that is acceptable by a user, and using the corresponding moving speed or angular speed as the shaking threshold.

If the computed moving speed or angular speed is determined as higher than the speed threshold, the analyzing module 164 determines the electronic apparatus 10 is extremely unstable during the time interval and accordingly estimates the clip of the video captured during the time interval is not suitable for being converted into the time-lapse video, and therefore the converting module 166 keeps the clip of the video in an original frame rate (step S406).

On the other hand, if the computed moving speed or angular speed is determined as not higher than the speed threshold, the analyzing module 164 determines the electronic apparatus 10 is stable during the time interval and accordingly estimates the clip of the video captured during the time interval is suitable for being converted into the time-lapse video, and therefore the converting module 166 converts the clip of the video into the time-lapse video (step S408). As a result, the clips of the video can be appropriately converted or kept unchanged, and a time-lapse video containing well converted time-lapse clips is obtained.

It is noted that, in another example, the converting module 166 may simply remove the clip of the video from the video if the analyzing module 164 determines the stability of the electronic apparatus 10 is unstable for the time interval during which the clip of the video is recorded, so as to obtain a time-lapse video with better quality.

In another example, the stability of the electronic apparatus may be further classified into multiple levels and the level of the stability may be used as a reference to determine a frame rate to be applied to convert the clip of the video. An example is given below for further illustration.

Figure 5:
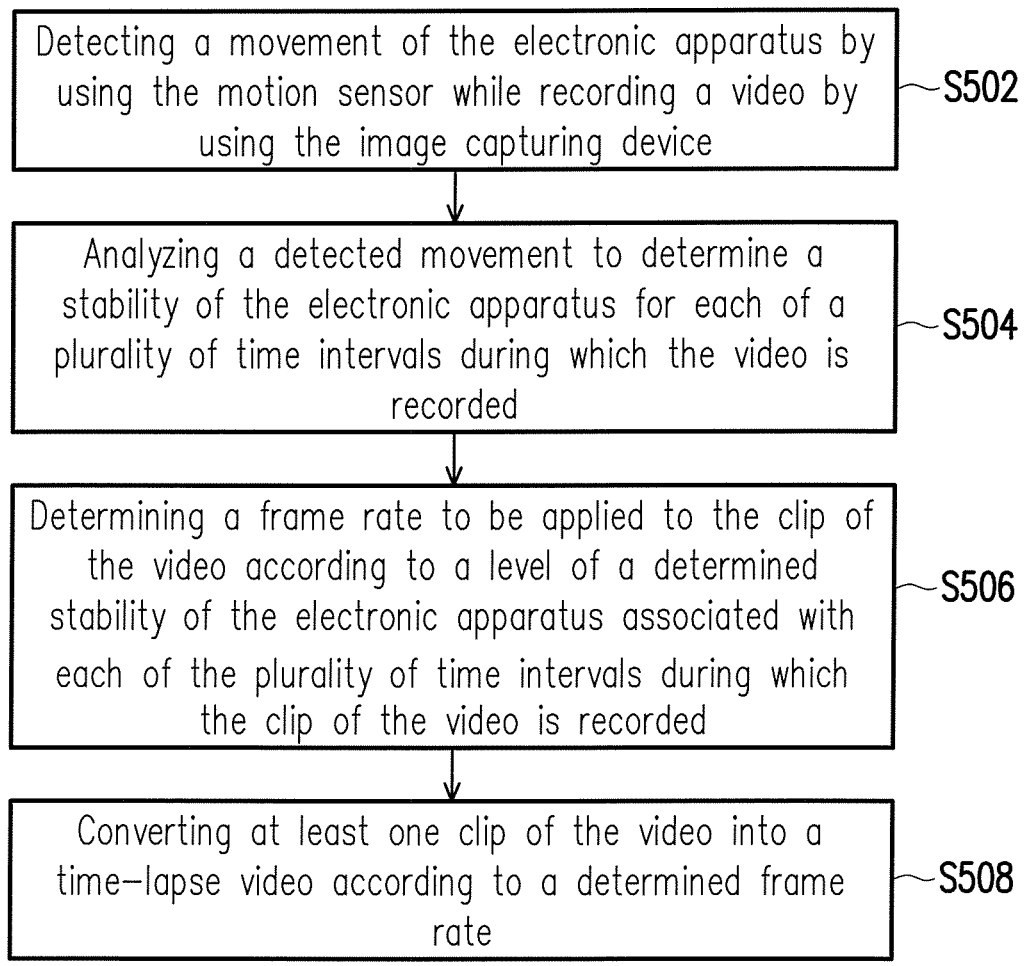
FIG. 5 is a flowchart illustrating a method for generating a time-lapse video according to an example of the disclosure.

FIG. 5 is a flowchart illustrating a method for generating a time-lapse video according to an example of the disclosure. Referring to FIG. 1 and FIG. 5 together, the method of the present example is adapted for the electronic apparatus 10 of FIG. 1. Detailed steps in the method of the present example are described below with reference to each component of the electronic apparatus 10 depicted in FIG. 1.

First, the movement detecting module 162 detects the movement of the electronic apparatus 10 by using the motion sensor 14 while recording a video by using the image capturing device 12 (step S502). Then, the analyzing module 164 analyzes the detected movement to determine a stability of the electronic apparatus 10 for each of a plurality of time intervals during which the video is recorded (step S504). Steps S502 to S504 described above are the same as or similar to steps S202 to S204 of the preceding example and thus, detailed contents are not repeated herein.

Different from the preceding example, in the present example, the converting module 166 further determines a frame rate to be applied to the clip of the video according to a level of the determined stability for the time interval during which the clip of the video is recorded (step S506), and then converts the at least one clip of the video into the time-lapse video according to the determined frame rate (step S508). In detail, the frame rate represents the frequency at which the video frames are captured from the video. If the frame rate to be applied is low, the video frames captured from the video for each time interval is less and the captured video frames appear to be noncontinuous if a shaking level of the electronic apparatus 10 is high. Therefore, a lower frame rate (i.e. less frames are captured in a time interval) can be used for converting the video if a level of the stability of the electronic apparatus is high, and a higher frame rate (i.e. more frames are captured in a time interval) can be used for converting the video if a level of the stability of the electronic apparatus is low.

Through aforesaid method, different frame rates suitable for converting different clips of the video can be applied to convert those clips into the time-lapse clips. As such, the clips of the video can be adaptively and appropriately converted, and a time-lapse video containing the time-lapse clips with different frame rates is obtained.

The present disclosure further provides a non-transitory computer readable medium in which a computer program is record. The computer program is used to execute each step in the method for generating a time-lapse video as described above. The computer program is composed of a plurality of program code sections (i.e., building an organization diagram program code section, approving a list program code section, setting a program code section, and deploying a program code section). Moreover, after the program code sections are loaded into the electronic apparatus and executed, the steps in the method for generating a time-lapse video may be implemented.

To sum up, in the method and the electronic apparatus for generating a time-lapse video and a recording medium using the method provided by the disclosure, motion sensors disposed on the electronic apparatus is used to detect the stability of the electronic apparatus when recording the video and the stabilities detected at different time intervals are used to determine which clips (corresponding to the time intervals, respectively) are suitable for being converted into time-lapse clips and are further used to determine the frame rate used to convert the clips. Accordingly, the clips of the video can be adaptively and appropriately converted, and a time-lapse video containing well converted time-lapse clips is obtained.

Although the invention has been described with reference to the above examples, it will be apparent to one of the ordinary skill in the art that modifications to the described example may be made without departing from the spirit of the invention. Accordingly, the scope of the invention will be defined by the attached claims not by the above detailed descriptions.

What is claimed is:

1. A method for generating a time-lapse video, adapted for an electronic apparatus having an image capturing device and at least one motion sensor, comprising:
   detecting a movement of the electronic apparatus by using the at least one motion sensor while recording a video by using the image capturing device;
   analyzing a detected movement to determine a stability of the electronic apparatus for each of a plurality of time intervals during which the video is recorded; and
   converting at least one clip of the video into a time-lapse video according to a determined stability of the electronic apparatus associated with each of the plurality of the time intervals during which the clip of the video is recorded, wherein the step of converting the at least one clip of the video into the time-lapse video further comprises:
   determining a frame rate to be applied to the clip of the video according to a level of the determined stability of the electronic apparatus associated with each of the plurality of time intervals during which the clip of the video is recorded; and
   converting the at least one clip of the video into the time-lapse video according to the determined frame rate.

2. The method according to claim 1, wherein the step of analyzing the detected movement to determine the stability of the electronic apparatus for each of the plurality of time intervals during which the video is recorded comprises:
   computing a shacking level of the electronic apparatus for each of the time intervals according to the detected movement and comparing the computed shacking level with a shaking threshold; and
   determining the stability of the electronic apparatus is unstable for the time interval if a computed shacking level of the time interval is higher than the shaking threshold.

3. The method according to claim 2, wherein the step of converting the at least one clip of the video into the time-lapse video according to the determined stability of the electronic apparatus associated with each of the plurality of time intervals during which the clip of the video is recorded comprises:
   converting the clip of the video into the time-lapse video if the stability of the electronic apparatus associated with one of the plurality of the time intervals is determined as stable during which the clip of the video is recorded.

4. The method according to claim 3, wherein further comprising:
   keeping the clip of the video in an original frame rate if the stability of the electronic apparatus associated with one of the plurality of the time intervals is determined as unstable during which the clip of the video is recorded.

5. The method according to claim 3, further comprising:
   removing the clip of the video from the video if the stability of the electronic apparatus associated with one of the plurality of the time intervals is determined as unstable during which the clip of the video is recorded.

6. The method according to claim 1, wherein the step of analyzing the detected movement to determine the stability of the electronic apparatus for each of the plurality of time intervals during which the video is recorded comprises:
   computing a moving speed or an angular speed of the electronic apparatus for each of the time intervals according to the detected movement and comparing the moving speed or the angular speed with a speed threshold; and
   determining the stability of the electronic apparatus associated with one of the plurality of the time intervals is unstable if the computed moving speed or the angular speed for the time interval is higher than the speed threshold.

7. The method according to claim 6, wherein the step of converting the at least one clip of the video into the time-lapse video according to the determined stability for the time interval during which the clip of the video is recorded comprises:
   converting the clip of the video into the time-lapse video if the stability of the electronic apparatus associated with one of the plurality of the time intervals is determined as stable during which the clip of the video is recorded.

8. The method according to claim 7, wherein further comprising:
   keeping the clip of the video in an original frame rate if the stability of the electronic apparatus associated with the time interval is determined as unstable during which the clip of the video is recorded.

9. The method according to claim 7, further comprising: removing the clip of the video from the video if the stability of the electronic apparatus associated with the time interval is determined as unstable during which the clip of the video is recorded.

10. An electronic apparatus for generating a time-lapse video, comprising:
an image capturing device, configured to record a video;
at least one motion sensor, configured to detect a movement of the electronic apparatus;
a storage device, configured to store the video and a plurality of modules; and
a processor, coupled to the image capturing device, the at least one motion sensor and the storage device and configured to access and execute the modules recorded in the storage device, wherein the modules comprise:
a movement detecting module, configured to detect the movement of the electronic apparatus by using the at least one motion sensor while the image capturing device records the video;
an analyzing module, configured to analyze a detected movement to determine a stability of the electronic apparatus for each of a plurality of time intervals during which the video is recorded; and
a converting module, configured to convert at least one clip of the video into a time-lapse video according to the determined stability of the electronic apparatus associated with each of the plurality of the time intervals during which the clip of the video is recorded,
wherein the converting module is further configured to determine a frame rate to be applied to the clip of the video according to a level of the determined stability of the electronic apparatus associated with each of the plurality of time intervals during which the clip of the video is recorded and convert the at least one clip of the video into the time-lapse video according to the determined frame rate.

11. The electronic apparatus according to claim 10, wherein the analyzing module comprises computing a shacking level of the electronic apparatus for each of the time intervals according to the detected movement, comparing a computed shacking level with a shaking threshold, and determining the stability of the electronic apparatus associated with one of the plurality of time intervals is unstable if a computed shacking level for the time interval is higher than the shaking threshold.

12. The electronic apparatus according to claim 11, wherein the converting module comprises converting the clip of the video into the time-lapse video if the analyzing module determines the stability of the electronic apparatus associated with one of the plurality of time intervals is stable during which the clip of the video is recorded.

13. The electronic apparatus according to claim 12, wherein the converting module further keeps the clip of the video in an original frame rate or removes the clip of the video from the video if the analyzing module determines the stability of the electronic apparatus associated with one of the plurality of the time intervals is unstable during which the clip of the video is recorded.

14. The electronic apparatus according to claim 10, wherein the analyzing module comprises computing a moving speed or an angular speed of the electronic apparatus for each of the time intervals according to the detected movement and comparing the moving speed or the angular speed with a speed threshold, and determining the stability of the electronic apparatus is unstable for the time interval if the computed moving speed or the angular speed for the time interval is higher than the speed threshold.

15. The electronic apparatus according to claim 14, wherein the converting module comprises converting the clip of the video into the time-lapse video if the analyzing module determines the stability of the electronic apparatus associated with one of the plurality of the time intervals is stable for the time interval during which the clip of the video is recorded.

16. The electronic apparatus according to claim 15, wherein the converting module comprises keeping the clip of the video in an original frame rate or removing the clip of the video from the video if the analyzing module determines the stability of the electronic apparatus associated with one of the plurality of the time intervals is unstable during which the clip of the video is recorded.

17. The electronic apparatus according to claim 10, wherein the at least one sensor comprises one or a combination of a G-sensor, a gyro sensor, a digital compass, or a GPS.

18. A non-transitory computer readable medium for recording a computer program to be loaded by an electronic apparatus to execute steps of:
detecting a movement of the electronic apparatus by using at least one motion sensor while recording a video by using an image capturing device;
analyzing a detected movement to determine a stability of the electronic apparatus for each of a plurality of time intervals during which the video is recorded; and
converting at least one clip of the video into a time-lapse video according to a determined stability of the electronic apparatus associated with each of the plurality of the time intervals during which the clip of the video is recorded, wherein the step of converting the at least one clip of the video into the time-lapse video further comprises:
determining a frame rate to be applied to the clip of the video according to a level of the determined stability of the electronic apparatus associated with each of the plurality of time intervals during which the clip of the video is recorded; and
converting the at least one clip of the video into the time-lapse video according to the determined frame rate.

* * * * *